July 22, 1924.
M. W. CARTY
1,502,135
APPARATUS FOR SEPARATING SOLID PARTICLES FROM A GAS STREAM CONTAINING THEM
Filed June 28, 1920      6 Sheets-Sheet 1
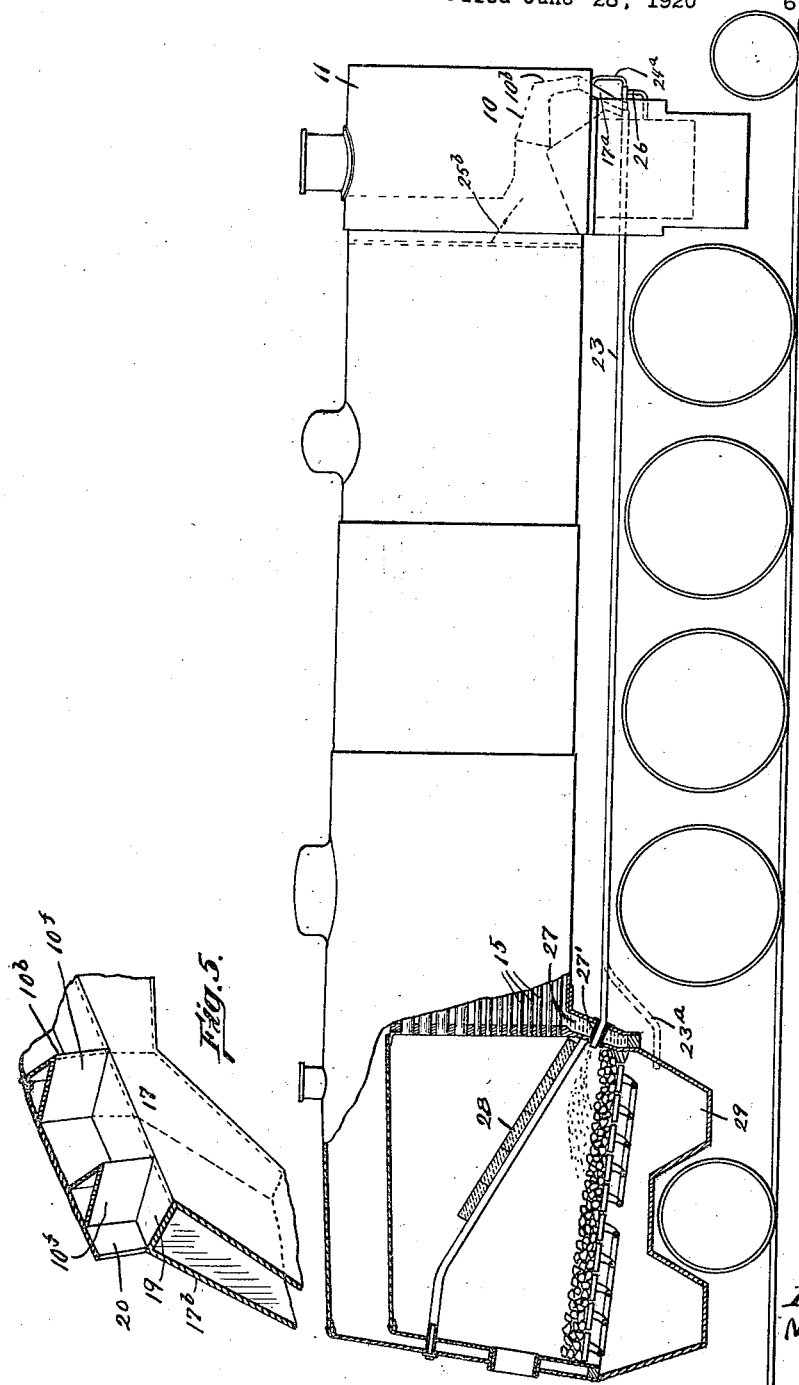

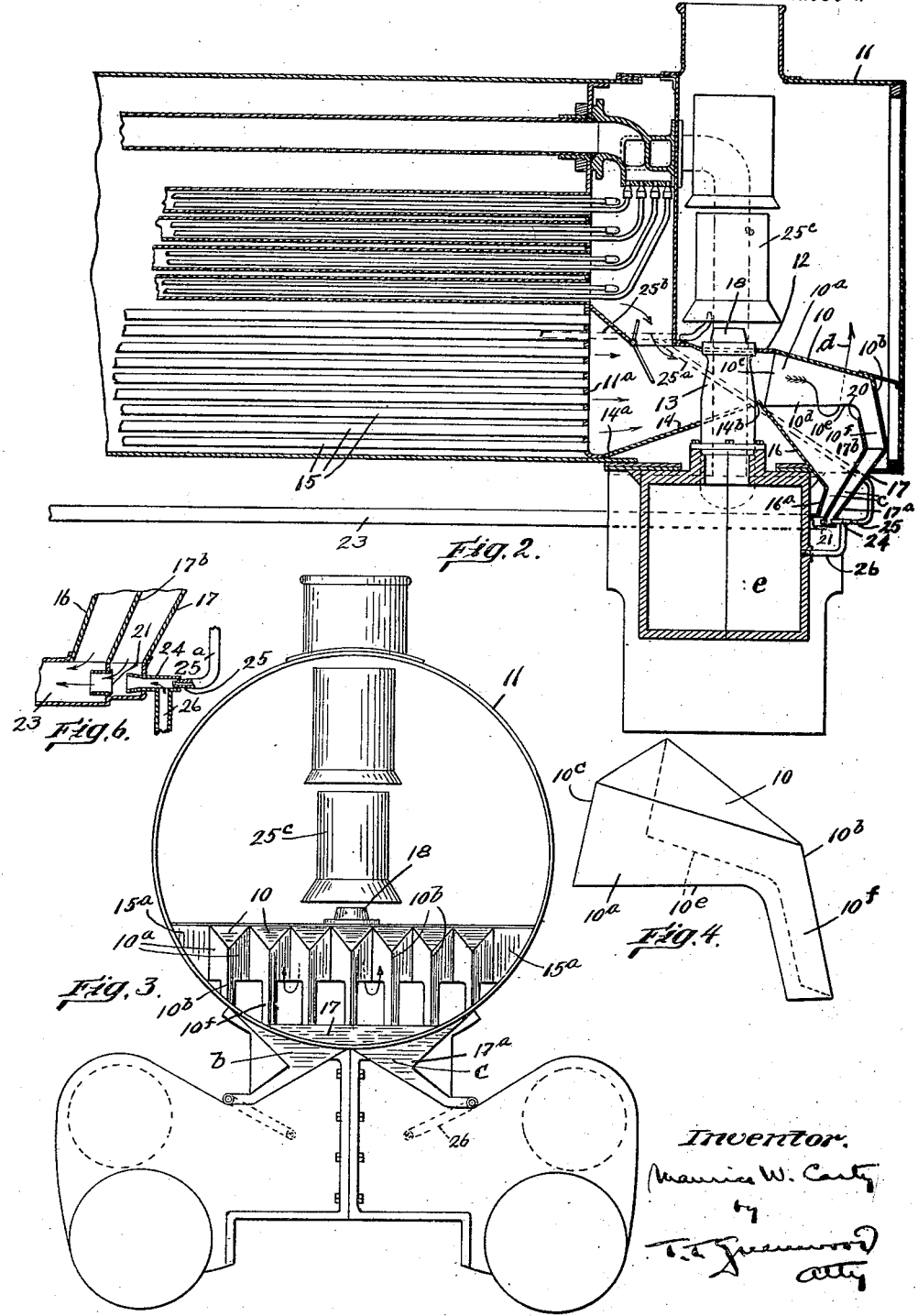

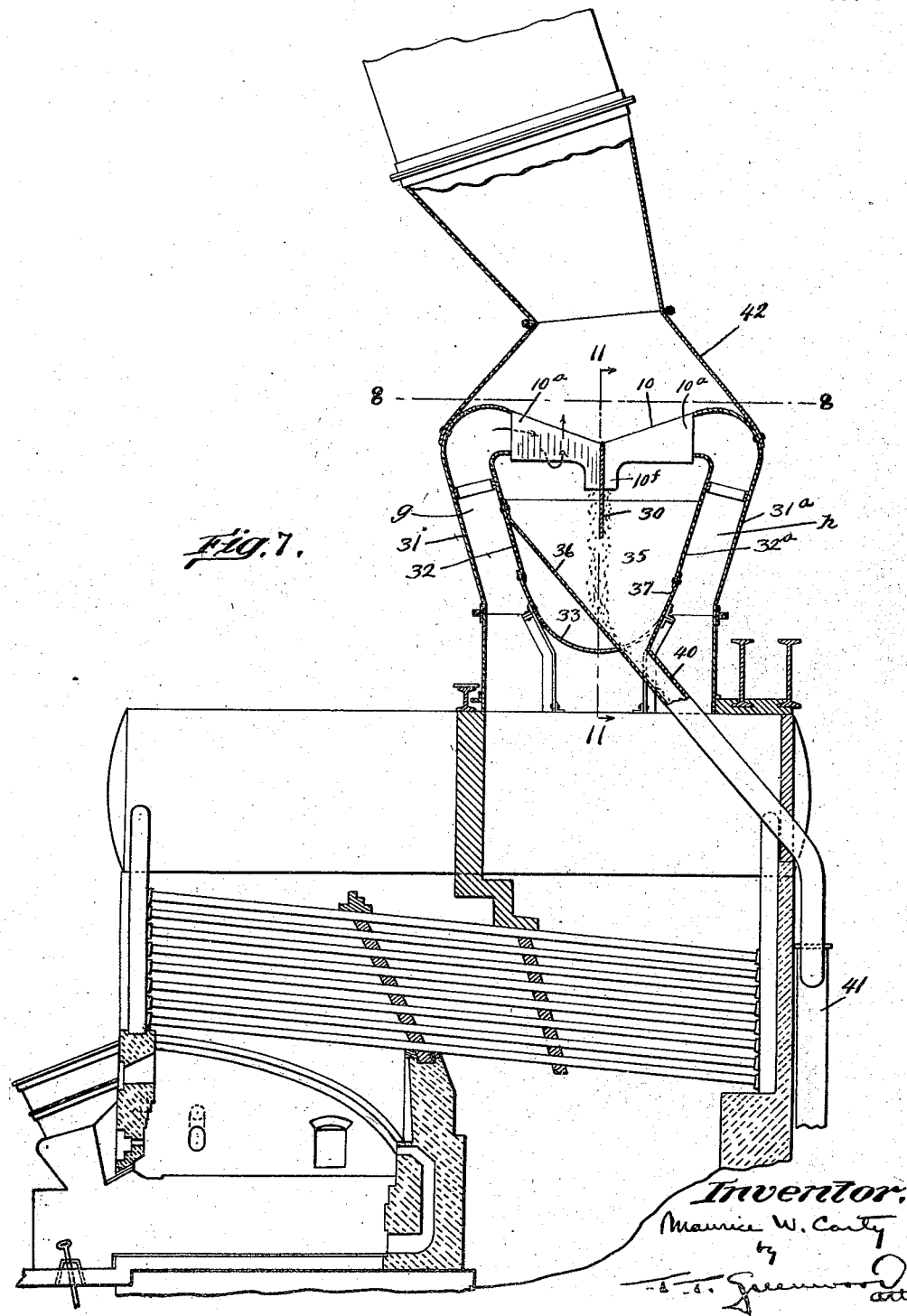

July 22, 1924.

M. W. CARTY 1,502,135

APPARATUS FOR SEPARATING SOLID PARTICLES FROM A GAS STREAM CONTAINING THEM

Filed June 28, 1920    6 Sheets-Sheet 5

Inventor,
Maurice W. Carty
by
Atty

July 22, 1924.
M. W. CARTY
1,502,135
APPARATUS FOR SEPARATING SOLID PARTICLES FROM A GAS STREAM CONTAINING THEM
Filed June 28, 1920   6 Sheets-Sheet 6
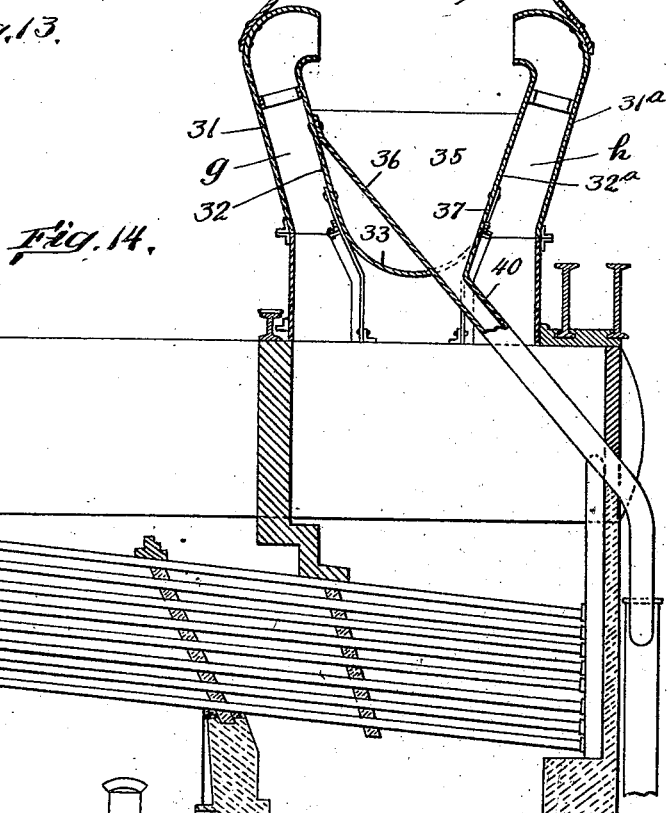
Inventor.

Patented July 22, 1924.

1,502,135

UNITED STATES PATENT OFFICE.

MAURICE W. CARTY, OF BOSTON, MASSACHUSETTS.

APPARATUS FOR SEPARATING SOLID PARTICLES FROM A GAS STREAM CONTAINING THEM.

Application filed June 28, 1920. Serial No. 392,390.

*To all whom it may concern:*

Be it known that I, MAURICE W. CARTY, a citizen of the United States, residing at Boston, in the county of Suffolk and State of Massachusetts, have invented an Improvement in Apparatus for Separating Solid Particles from a Gas Stream Containing Them, of which the following is a specification.

This invention relates to apparatus for the extraction of solid particles from gas streams containing them, as for the separation of cement dust from the gases in cement mills and the like and, in particular, relates to apparatus for the extraction of solid particles, as cinders, and unburned coal, from the flue gases of coal-burning boiler furnaces.

The usual apparatus for this purpose has means to set up a centrifugal action of the gas stream, or baffle plates by which the gas stream is deflected and against which the moving particles impinge, to cause the particles to be separated from the body of the stream; but the construction is such that, besides causing considerable draft loss, the solid particles fall into, and the majority of them are again picked up by, the gas stream and are carried out of the apparatus; or water screens which cause considerable draft loss and the formation of acids which corrode the flues and other metallic parts in contact with the gas stream. While, for power generating plants, the liberation of waste gases having a large proportion of cinders may cause considerable property harm by accumulation of cinders on adjacent buildings, it is highly desirable that the waste gases of locomotives are freed of all sparks and cinders because of the great fire hazard to property disposed along the right of way.

An object of my invention is to provide an apparatus employing the momentum of the particles in the gas stream, preferably aided by gravity, to project them permanently out of the gas stream into a dead gas space or pocket from which they may be removed in any desirable manner.

A further, and more specific, object of my invention is to provide means to direct the gas in a stream having a long horizontal length and small vertical height over a dead gas space into which the solid particles will be projected and deflect the stream abruptly upward to effect such projection of the particles.

I have found that a reason for the relative inefficiency of the separating apparatus in present use is the treating of relatively large volumes of gas with a single, or but relatively few, separating devices with the result that a large proportion of the gas passed through the apparatus is but slightly treated and therefore retains a large proportion of the solid matter suspended therein. I have found, however, that when the main gas stream is divided into a plurality of small streams and each small stream is independently acted upon by separating devices, the proportion of gas that escapes adequate treatment is relatively small so that the apparatus has a high efficiency.

A further object of the invention, therefore, is to provide an apparatus in which the gas stream is divided into a plurality of small streams and each small stream is separately treated to extract the solid particles therein.

Another object of the invention is to provide the combination of separating apparatus and power-actuated means adapted continually to remove the solid particles from the apparatus as they are extracted from the gas stream and transport them to a suitable place for disposal. When the separating apparatus is applied to a locomotive, I prefer to employ, as the power-actuated means, a steam ejector supplied by exhaust steam from the cylinders arranged to exert a suction effect in the cinder hopper and abstract cinders therefrom and move them through a conductor pipe to a suitable place for disposal.

The solid particles contained in the flue gases from a furnace, especially with forced draft, or mechanically stoked furnaces, as some boiler plants and locomotives, include a relatively large proportion of unburned coal. The cinders also contain a relatively high proportion of combustible matter, often as high as 70%. A considerable amount of solid particles are discharged from the stacks of power plants and, in view of the relatively high combustible content of the particles, the fuel loss is considerable.

A further object of the invention, therefore, is to separate the solid particles from the flue gases and return them into the fire to be consumed, thereby to increase the efficiency of the plant; and preferably the rate of delivery of the particles to the fire will be proportional to the rate of extraction of the particles from the flue gases.

A further object is generally to improve the design, construction and operation of apparatus for the separation of solid particles from a gas stream containing them, and the disposal of the separated particles.

Fig. 1 is a side elevation, partly in section, of a locomotive with my invention applied thereto.

Fig. 2 is a longitudinal sectional elevation of the front end of the locomotive of Fig. 1 and the cinder separator therein.

Fig. 3 is a front view of the separator in the locomotive smoke box.

Fig. 4 is a perspective view of a separator element.

Fig. 5 is a detail, in perspective, of the cinder hopper adapted to receive cinders from the cinder guides of the separator elements.

Fig. 6 is a sectional detail of the cinder ejector apparatus.

Fig. 7 is a sectional elevation of a modified form of the apparatus installed in the uptake of a mechanically stoked stationary boiler.

Fig. 13 is a perspective sectional diagrammatic detail ilustrating the arrangement of the dust pocket and gas conduit with the separator elements removed from position in front of the exit passage of the gas conduit.

Fig. 14 is a vertical sectional view similar to Fig. 7 but with the separator elements removed from position in front of the exit passage of the gas conduits.

The apparatus embodying my invention, in the more complete embodiment thereof, is adapted to divide the cinder-laden gas stream into a plurality of small thin streams and separate the cinders from each of the small streams. For this purpose the apparatus is provided with a plurality of identical separator elements, as many as the requirements of any particular installation may indicate, arranged in the path of the gas stream, each adapted to act upon that portion of the gas stream directed through it and separate the cinders therefrom.

While, broadly, any suitable type of separator element may be employed, which collectively will form a cinder separating apparatus, thereby to fulfill certain features of my invention, I prefer to employ the separator element having the characteristics disclosed in the construction illustrated in Fig. 4, which has been found to be particularly satisfactory.

As shown in Fig. 4, the separator element comprises the V-shaped or pyramidal shaped structure formed preferably of sheet material and having the top wall 10 which preferably is inclined slightly downward, and the downwardly extended vertical side walls $10^a$ which are inwardly inclined from the base of the structure and are contiguous at the apex $10^b$ thereby to enclose a V-shaped compartment having the open end or base $10^c$ through which the cinder-laden gas is adapted to enter the compartment and the open bottom $10^d$ through which the gas from which a large proportion of the cinders have been separated, leaves the compartment; and the arrangement of the compartment is such that its length and also its open bottom is extended in the direction of gas entrance. Preferably the bottom edges $10^e$ of the side walls are substantially horizontal, when the apparatus is installed, so that the vertical height of the side walls will be less at the apex than at the base of the structure.

The side walls of the elements at the apex are extended downward a suitable distance below the bottom edges $10^e$ whereby to form the V-shaped chute $10^f$ which is adapted to guide the cinders separated from the gas stream downwardly into a hopper or the equivalent disposed therebelow.

Figure 8:
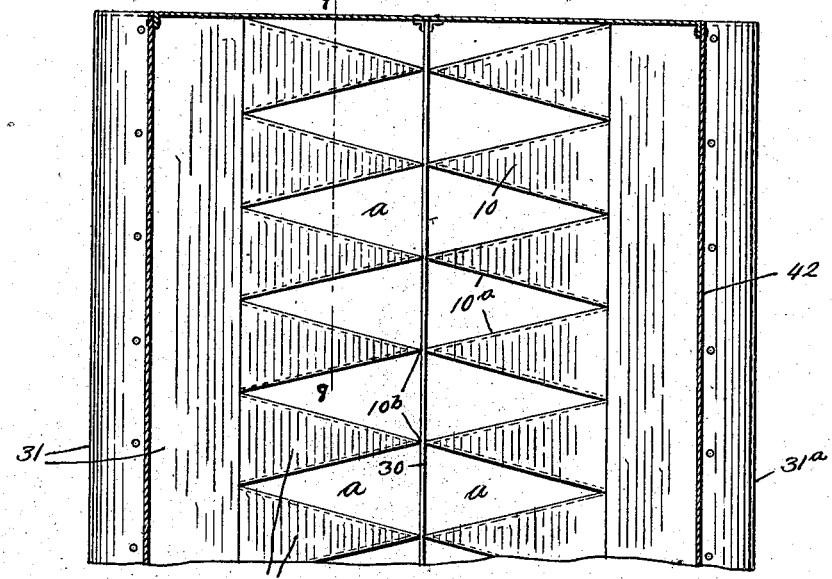
Fig. 8 is a sectional detail, in plan, along line 8—8 of Fig. 7.
Figures 9, 10:
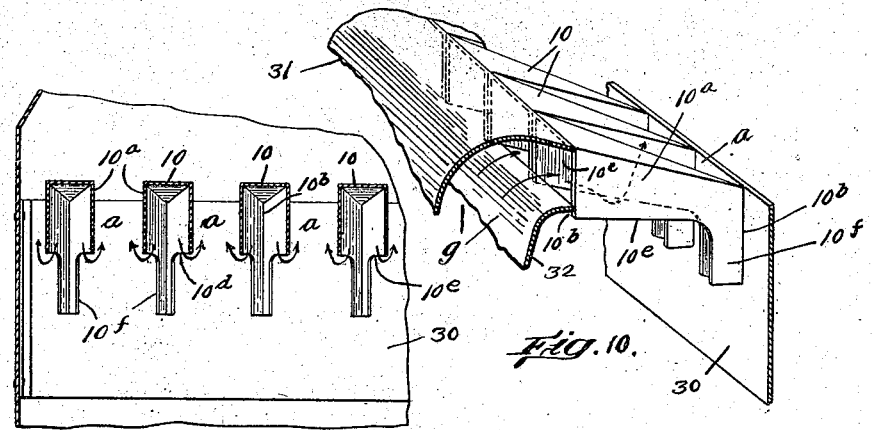
Fig. 9 is a detailed sectional elevation along line 9—9 of Fig. 8.
Fig. 10 is a perspective detail of a few of the separator elements of Fig. 7.
Figure 11:
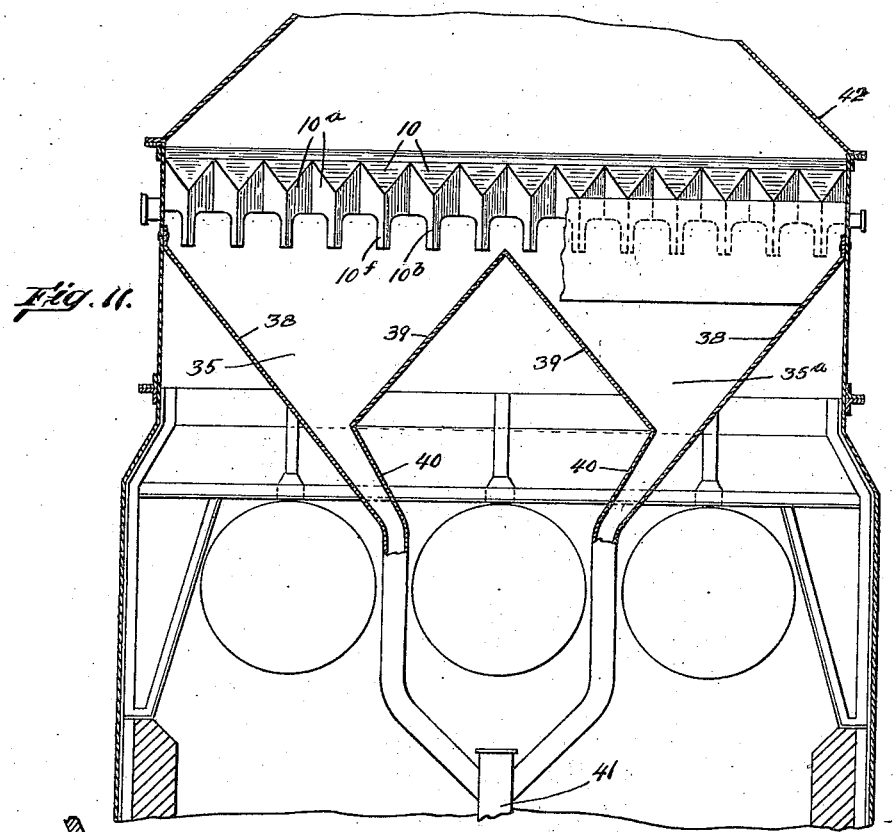
Fig. 11 is a vertical sectional elevation of the apparatus along line 11—11 of Fig. 7.

As many separator elements as are found to be desirable will be employed which will be arranged in rows with the vertical edges of the side walls $10^a$ at their base in contact and their apices will be separated whereby a plurality of gas passages, indicted at $a$, Fig. 8, will be provided between the elements for the cinder-free gas. The elements may be variously arranged, as in a single row, as in Fig. 2, in opposed rows, as Fig. 8, in tiers or in circular formation not necessarily shown.

Means are provided to guide the cinder-laden gas stream into the open bases or ends of the elements and to guide the cinder-free gas away from the elements to a stack or other means for its disposal. A cinder hopper is disposed beneath the open bottoms of the elements and is of suitable extent to provide a dead gas space into which the cinders fall; and the gas stream is adapted to enter the top part of the hopper to pass out through the passages $a$ between the separator elements.

In the application of the invention to locomotives as illustrated in Figs. 1, 2 and 3, a plurality of separator elements are disposed in a single row in the front end within the smoke box shell 11 of the locomotive and under the table plate 12 and in front of the steam exhaust pipe 18 where the separator will be in such a position that it will not interfere with the stack draft or with the action of the various parts of the locomotive disposed at this end.

The base edge of the top wall 10 of each separator element is placed in substantial contact with the table plate 12 and practically flush with the lower surface thereof whereby the flue gases will be directed within the elements with the minimum of obstruction. All of the elements are adapted to be placed in line and in contact with each other so that there will be no leakage of cinder-laden gases past the elements into the stack.

A guide plate 14 having an aperture at its forward end through which the exhaust pipe 18 is passed is arranged in the smoke box to guide the flue gas from the boiler tubes into the separator elements. The rear end $14^a$ of said plate is curved substantially to conform with the inner periphery of the smoke box shell 11 and disposed substantially in contact therewith at the junction of the front tube sheet $11^a$ with said smoke box. The forward end $14^b$ of said plate is substantially straight and is arranged to extend somewhat above the lower edges of the side walls of the separator elements whereby all of the gas will be guided directly into the elements.

A cinder hopper, divided into two pockets $b$ and $c$ symmetrically disposed on each side of the vertical axis of the locomotive, is disposed beneath the separator elements and is adapted to provide a dead gas pocket beneath the elements and to receive the cinders separated from the flue gases. Said cinder hopper is formed by the rear plate 16 which is extended across the smoke box and has its lower edge curved to conform to the curvature of said smoke box. Said plate is downwardly inclined from the forward edge $14^b$ of the guide plate 14 beneath the separator elements and has the triangularly shaped lower portions $16^a$ which project through apertures in said smoke box 11 to form the rear walls of the two cinder pockets. A front plate 17 extends from the lower end of the apices of the cinder chutes of the separator elements and is inclined downwardly toward the rear and is formed with the triangularly shaped lower-portions $17^a$ and cooperates with the rear plate 16 to provide the two V-shaped pockets in which the cinders are collected.

The cinder-laden gases drawn from the boiler tubes 15 by the draft action created by the exhaust pipe 18 are guided between the table plate 12 and the guide plate 14 and the locomotive smoke box shell 11 into the separator elements.

Due to the closed ends of the compartments of the separator elements and the formation of dead gas pockets therein, and the shape of the compartments, the gas stream is constrained to converge laterally and deflect downwardly and to separate into two lateral streams or sheets which pass through the open bottoms of the compartments and pass with considerable velocity under the bottom edges $10^e$ of the side walls upwardly into the passages $a$ between the separator elements. The path of the gas stream is clearly indicated by the arrow $d$.

Due to the weight and momentum of the solid particles in the gas stream, said particles tend to maintain their initial direction of motion regardless of the change of direction of motion of the gas stream. Consequently the particles are projected out of the gas stream and are guided by the side walls of the compartments into the dead gas space in the apices of the separator elements and thence are guided downward by the chutes $10^f$ of said elements into the hopper. Practically all of the particles will be removed in this manner.

Some of the particles, however, and more especially those having the least weight, may yet be retained in the gas stream. However, as the gas curls rapidly under the bottom edges of the sides of the separator elements a whipping action is set up which snaps out of the gas stream the majority of the remaining cinders held in suspension therein; and that which remains is practically an impalpable dust. The extraction of the cinders is materially assisted by the force of gravity inasmuch as the cinders may fall out of the gas stream into the dead gas space in the hopper at any time while the gas is in the separator elements, due to the open bottoms thereof, so that the gas stream, as it finally issues from the separator apparatus, is free from sparks and cinders and practically free from solid particles. At each change of direction of flow of the gas, a centrifugal motion is set up which effects the separation of dust from the gas stream.

The triangular form of the gas passages $a$ between the separator elements, in connection with the triangular form of the gas passages in the elements, and their relative disposition with the apex of one passage at the base of the contiguous passage provides a combined passage of ample area which consequently offers but little resistance to the flow of gas therethrough whereby the draft loss in the apparatus is small.

It will be noted that, due to the cylindrical formation of the locomotive smoke box shell 11 the cinder chutes of the end separator elements are somewhat reduced in length; and also that filler plates 15ª are disposed between the side walls of the end separator element and said shell to fill in the space therebetween, and guide the cinder-laden gas stream into the end elements.

The form of each separator element is such that it provides a definite trap for the solid particles.

Inasmuch as a considerable proportion of the solid matter in the waste gases from a boiler furnace is unconsumed coal, especially when operating under forced draft, and the cinder content of the gases has a relatively high proportion of combustible matter, often as high as 70%, it is highly desirable to render available the combustible particles for burning thereby to increase the overall efficiency of the power plant; and power-actuated means are herein shown for automatically removing the particles from the cinder hopper as they are delivered therein and conducting them to the fire box of the locomotive for consumption. While there are a number of means that may be employed for this purpose, I prefer, because of its simplicity, to utilize, as the power-actuated means, a steam ejector apparatus especially as surplus exhaust steam is available on a locomotive by which to operate it and said ejector apparatus will have a pulsating action inasmuch as the exhaust blasts from the locomotive cylinders are intermittent.

While the ejector apparatus may be arranged to create its suction effect at the base of the hopper, I prefer to extend the suction effect, in addition, directly into the cinder chutes of the separator elements and I have here shown the separator apparatus above described arranged for this purpose, although obviously, this feature of the invention may be applied to other installations or dispensed with when desired without impairing the efficiency of the separator apparatus.

For this purpose of providing a suction effect in the cinder chutes of the separator elements, a second or auxiliary hopper is arranged within the main hopper and is formed by the plate 17ᵇ which is spaced from the front plate 17 of the main hopper and extends from the forward portion of the guides downward. A plate 19 bridges over said plates 17 and 17ᵇ and has V-shaped apertures therein in which the guides or chutes are received and by which communication is established from said chutes to the auxiliary cinder hopper. A plate 20 extends upwardly from the top of the plate 17ᵇ in contact with the front edges of said chutes substantially to the lower edges of the side walls of the separator elements whereby to provide, with the chutes, enclosed channels down which the cinders will fall and be delivered to the ejector apparatus.

Preferably a two stage ejector is utilized. The first stage is in communication with the auxiliary cinder hopper at its base and discharges cinders taken therefrom through the nozzle 21 into the second stage. The second stage is in communication with the main hopper at its base. The discharge through said nozzle 21 entrains cinders in said main hopper and forces them into the cinder pipe 23 by which the cinders are conducted away from the separator apparatus. Steam is ordinarily supplied to the steam nozzle 24 of the ejector apparatus through the pipe 26 in communication with the exhaust cavity e of the cylinder casting and the ejector will consequently function while the locomotive is in motion and using steam.

It is desirable, however, to provide a certain degree of suction effect while the locomotive is stationary or drifting, in order to remove the cinders as collected and, for this purpose, a small auxiliary nozzle 25 is provided which is arranged to discharge live steam through the exhaust steam nozzle 24. Said nozzle 25 is adapted to receive live steam through the pipe 25ª connected with the blower pipe line 25ᵇ, which latter is usually provided to supply live steam to the draft pipe 25ᶜ when the locomotive is stationary or drifting.

Said cinder pipe 23 extends toward the fire box of the locomotive for the disposal of the cinders. Preferably I discharge the cinders into the fire box to be burned thus to improve the overall efficiency of the locomotive and at the same time satisfactorily to dispose of the cinders; and preferably I discharge the cinders into the fire box under the combustion arch at or near its lowest point over the fire whereby to obtain a long period of contact of the cinders and the hot gases in the fire box and the complete combustion of the cinders.

For this purpose the water leg 27 at the fire box has the tube 27′ therethrough, and the cinder pipe 23 extends therethrough into the fire box above the fire and below the lower end of the combustion arch 28 and the combustible particles will be sprayed over the fire bed. Said cinder pipe 23 is adapted to be a loose fit within said tube 27′ whereby air for the combustion of the cinders will be drawn into the fire box. The steam from the ejector coming in contact with the lower surface of the brick arch may have a beneficial effect in lengthening its life. If desired, however, the cinders may be discharged into a suitable storage receptacle as the ash pan 29 by directing said pipe 23 thereinto as indicated by its dotted position 23ª.

Fig. 7 illustrates the invention as arranged in the smoke uptake of a mechanically stoked water tube boiler. As a convenient method of providing for the requisite number of separator elements, the elements are arranged in two opposed rows with their apices in juxtaposition and separated and connected by the separator plate 30 which is extended downward for a suitable distance below the end of the cinder guides or chutes into a cinder hopper disposed therebeneath. A separate path for the flow of the cinder-laden gas stream from the boiler furnace to each row of separator elements is provided by the upwardly and outwardly inclined outer plates 31 and 31ª and the parallel inner plates 32 and 32ª spaced from said outer plates to form the upwardly and outwardly inclined passages $g$ and $h$. The lower ends of said plates 32 and 32ª are connected by the curved plate 33 suitably spaced above the boiler steam drums whereby to guide the gases into said passages $g$ and $h$. The cinder-laden gas stream is directed into the open ends of said separator elements by reflexing the upper ends of said plates 31 and 31ª inwardly and slightly downward in a gradual curve; and the edges of said plates are arranged in substantially gas tight engagement with the top walls 10 of the separator elements whereby to form, in effect, a continuation of said plates. Said plates 32 and 32ª are also bent inwardly and engage the vertical faces of the side walls 10ª of the separator elements preferably somewhat above the extreme lower edges thereof whereby to ensure the passage of the cinder-laden gas directly into said elements. A cinder hopper, arranged with two V-shaped pockets 35 and 35ª by the downwardly and inwardly inclined rear walls 36 and 37 and the downwardly and inwardly inclined side walls 38 and 39, is disposed beneath the separator elements and provides a dead gas space into which the cinders are projected and are collected. Cinder conductors 40 extend from the lower portions of said cinder pockets and may extend to a common conductor 41, as shown, which conductor will be carried to any convenient point for the collection of cinders. Preferably the end of said conductor 41 will be under seal so as not to impair the normal draft action, and to prevent an upward flow of gas therein, due to draft suction, which will hinder the passage of cinders down the conductor.

The operaton of the separator apparatus in this application is identical with the operation of the apparatus previously described. Cinders are projected out of the path of the gas into the apices of the separator elements and fall downwardly into the hopper and cinders are also projected from the gas streams as they whip under the lower edges of the separator side walls and pass upwardly through the passages $a$ to the uptake or stack 42. Said plates 31 and 32, and 31ª and 32ª, each are arranged to provide an exit passage adapted to discharge a relatively long horizontal and thin stream or sheet into the separator elements and, by reason of the long thin stream and the abrupt downward deflection of the stream, caused by the separator elements, solid particles in the stream are projected from it into the apices of the elements, as above set forth, at which point the primary separation is effected. Lighter particles may be projected out of the sub-divided and yet thinner streams as they pass over the lower edge of the sides of the separator elements and thence upwardly between the separator elements.

The opposed rows of separator elements herein shown results in a compact and efficient separator apparatus causing but little loss of draft.

The apparatus may be installed in the path of the cinder-laden gases other than in the smoke uptake.

Figure 12:
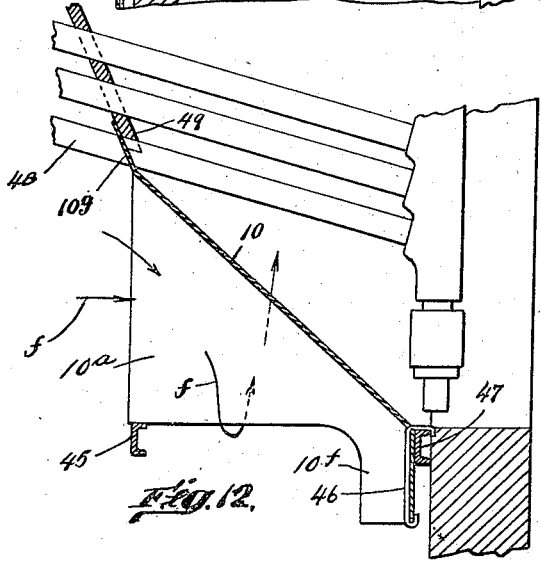
Fig. 12 is a detail in sectional elevation of a further modification of the invention arranged under the last pass of a water tube boiler.

In Fig. 12 the apparatus is illustrated as arranged under the last pass of a boiler of the type illustrated in Fig. 7. The separator elements are so arranged therein that the top walls 10 of the elements are inclined downwardly when the lower edges of the walls are substantially horizontal and the elements rest upon and are supported by the channel 45 at the base of the elements and are suspended from the channel 47 by the hanger 46 at the apices thereof. The top walls 10 of said separator elements are provided with the extensions 10ᵍ, or it may be a separate piece, having apertures or slots therein to receive the boiler tubes 48; and said extension 10ᵍ is in substantially gas tight contact with the baffle wall 49.

The arrangement of the separator is such that substantially all of the flue gases is directed through the separator as indicated by the arrows $f$.

As in the previous instances, cinders are projected from the gas into the apices of the elements and also projected from the gas as it whips under the bottom edges of the side walls of the elements; and the cinders accumulate below the separator and may be periodically removed.

In this arrangement the boiler setting provides the means to guide the cinder-laden gas stream into, and the cinder-free gas away from, the separator apparatus.

In the more complete embodiment of my invention, the gas containing solid particles is directed, by the conduits or ducts $g$ and $h$, Fig. 7, in a vertically thin stream having long horizontal extent into the separator elements, and is sub-divided by said elements into yet thinner streams which pass about the lower edges 10ª and 10ᵉ of said elements and are abruptly deflected upwardly over the dead gas space, with the result that solid particles are projected out of the gas on entering the elements and also on passing about the lower edges of the elements.

For certain purposes, I may omit the separator elements and cause the gas to pass in a vertically thin stream having long horizontal extent directly from the gas conduit or passage into the vertical flue over the dead gas space therein, wherein the gas stream is caused to change its direction of motion abruptly over the dead gas space and the solid particles therein will be projected out of the thin stream into the dead gas space.

Fig. 13 illustrates such an arrangement.

As illustrated in Fig. 13, the conduit $g$ extends more or less vertically upward and its upper or discharge end may be directed substantially horizontally into a vertical duct or flue 42 having the dead gas space 35 disposed below the discharge end of the conduit $g$; and said dead gas space 35 may comprise a cinder hopper. The discharge end of said conduit $g$ is shaped to provide a relatively long exit passage which has but relatively small vertical extent and with its length arranged substantially horizontally above the dead gas space; and the gas stream issuing from said exit passage will be long and thin. As it issues from the passage, it will bend abruptly upward and pass upward in the vertical duct 42. Due to the thinness and the velocity and the abrupt change in direction of motion of the gas stream, the solid particles contained therein, and which have substantial weight, will be projected through and out of the gas stream as it makes its bend upward and will fall beyond the stream into the dead gas space.

The arrangement is effective in removing the major portion of the solid portion from the gas stream. If it is desirable to effect further separation of the solid particles, the separator elements above set forth may be inserted in the thin gas stream to separate it into yet thinner streams and remove further solid particles from the stream. This particular arrangement is illustrated in Fig. 7. In said figure, and as above set forth, the plates 31 and 32, and 31ª and 32ª are shaped to provide a gas stream having long horizontal extent and small height or thickness. Due to the interposition of the separator elements in said stream, the stream is directed through said elements and solid particles are projected beyond the stream into the dead gas space in the apices of the elements. Lighter particles still remaining in the stream are projected from the sub-divided portions of the stream as said portions are passed over the lower edges of the elements and then upwardly. With this arrangement, the function of the long and thin initial stream, which is abruptly deflected as to direction of motion, is to effect a primary separation of the heavier particles therein contained and the separator elements function to remove lighter particles yet remaining after the primary separation has been effected. If it is desirable to remove only the heavier solid particles, the separator elements may be omitted and the long and thin gas stream may be permitted to pass from the conduits $g$ and $h$ directly over the dead gas space in the hopper. The long and thin streams are caused to change their direction of motion abruptly upwardly over said dead gas space and solid particles will be projected therefrom into the hopper.

Fig. 14 illustrates the above described arrangement and is a view similar to Fig. 7 with the separator elements removed. The gas will pass substantially horizontally in long and thin opposed streams directly into the up-take 42 over the dead gas space in the hopper and will be caused to change its direction of motion abruptly in an upward direction. Solid particles will be projected through and out of the thin streams by their momentum into the hopper. The thin streams will unite in the upper portion of the uptake to form a single larger stream, and the large stream will pass upwardly therein. With this arrangement, a substantial proportion of the solid particles, and especially the heavier particles, will be removed from the gas stream.

I claim:

1. Apparatus for separating solid particles from a gas stream containing them comprising a plurality of separator elements having gas inlets arranged in contiguity, and also having gas outlets, said separator elements arranged to divide the gas stream into a plurality of smaller streams and abruptly change the direction of flow of the small streams passed through them, said elements spaced apart behind said inlets to provide gas passages between them for the dust-free-gas, and a dust pocket common to all of said elements, said dust pocket having an open top disposed under and in communication with the gas outlets of said elements.

2. A cinder separator having a relatively long and narrow and deep compartment which has its length extended in the direction of gas entrance, and which has an open end, a closed top, a closed end opposite the open end, and an open bottom extending in the direction of gas entrance, said compartment arranged to receive the cinder-laden gas stream through its open end and deflect it downwardly to cause it to pass through the open bottom and under the bottom edges of the side walls upwardly out of the separator, whereby cinders will be projected out of the gas stream into the closed end of the compartment, from which they will fall out of the separator beyond the gas stream and also projected out of the gas stream as it passes under the bottom edges of the side walls.

3. Cinder separating apparatus comprising a receptacle adapted to receive cinders, a cinder separator having a compartment which has its length extended in the direction of gas entrance, and which has an open end, a closed top, a closed end opposite the open end, and an open bottom extended in the direction of gas entrance, said compartment disposed over said receptacle and arranged to receive the cinder-laden gas stream therein through its open end and deflect it downwardly through its open bottom and upwardly out of the separator under the bottom edges of its side walls, whereby the cinders will be projected from the gas stream into the closed end of the compartment from which they will fall into said receptacle and also be projected from the gas stream as it passes under the edges of the side walls and fall into said receptacle, and means to guide the cinder-laden gas stream into the open end of the separator, and the cinder-free gas stream from the separator.

4. A cinder separator having a relatively long and narrow and deep V-shaped compartment which has its length extended in the direction of gas entrance, and which has an open end, a closed top, a closed end opposite the open end, and an open bottom extended in the direction of gas entrance, said compartment arranged to receive the cinder-laden gas stream through its open end and direct it downwardly to cause it to pass through the open bottom and under the bottom edges of the side walls upwardly out of the separator, whereby the cinders will be projected out of the gas stream into the apex of the V-shaped compartment, and also out of the gas stream as it passes under the bottom edges of the side walls of the separator.

5. A cinder separator having a top-wall and downwardly extended side-walls inwardly inclined and contiguous at one end whereby to form a V-shaped compartment which has its length extended in the direction of gas entrance, and which has an open end, a closed end opposite the open end, and an open bottom extended in the direction of gas entrance, said compartment arranged to receive the cinder-laden gas stream through its open end and deflect it downwardly to cause it to pass through the open bottom under the bottom edges of the side walls upwardly out of the separator, whereby cinders will be projected from the gas stream into the apex of the V-shaped compartment and fall out of the separator beyond the gas stream, and also out of the gas stream as it passes under the bottom edges of the side-walls of the separator.

6. A cinder separator having a top-wall and downwardly extended side-walls having substantially horizontal bottom edges, said side walls inwardly inclined and contiguous at one end whereby to form a V-shaped compartment which has its length extended in the direction of gas entrance, and which has an open end, a closed end opposite the open end, and an open bottom extended in the direction of gas entrance, said compartment arranged to receive the cinder-laden gas stream through its open end and deflect it downwardly to cause it to pass through the open bottom under the bottom edges of the side-walls upwardly out of the separator, whereby cinders will be projected from the gas stream into the apex of the V-shaped compartment and fall out of the separator beyond the gas stream, and also out of the gas stream as it passes under the bottom edges of the side-walls of the separator.

7. A cinder separator having an inclined top-wall and downwardly extended side-walls, said side-walls inwardly inclined and contiguous at one end whereby to form a V-shaped compartment having its length extended in the direction of gas entrance, and having an open end remote from the apex of the compartment through which the cinder-laden gas is adapted to enter the separator and an open bottom extended in the direction of gas entrance through which the cinder-free gas is adapted to pass, said side-walls having downwardly extended portions at the apex to form a V-shaped guide for the passage of the cinders from the separator.

8. A cinder separator having a top-wall and downwardly extended and inwardly inclined side-walls arranged to form a V-shaped compartment which has its length extended in the direction of gas entrance, and which has an open end, a closed end opposite the open end, and an open bottom extending in the direction of gas entrance, said compartment having a chute projecting downwardly from the closed end thereof at an angle with the gas entrance to guide cinders from the separator.

9. A cinder separator including a duct for the cinder-laden gases, a plurality of V-shaped separator elements disposed in communication with said duct and arranged to divide the gas stream of said duct into a plurality of smaller streams and act on said smaller streams, said separator elements having V-shaped compartments having their length extended in the direction of gas entrance and formed with open ends and closed apices and open bottoms extended in the direction of gas entrance, said elements arranged with V-shaped gas passages between them, the cinder-laden gas adapted to enter the compartments through the open ends and pass downwardly out of the open bottoms upwardly through the V-shaped gas passages between the elements and the cinders projected from the gas streams into the apices of the compartments.

10. A cinder separator having a plurality of V-shaped separator elements and V-shaped gas passages between the elements, said elements having V-shaped compartments extended in the direction of gas entrance and having open ends and open bottoms extended in the direction of gas entrance, means to direct the cinder-laden gas stream through the open ends into said elements and a cinder hopper disposed beneath said separator elements.

11. A cinder separator having a plurality of V-shaped separator elements arranged with their lengths extended in the direction of gas entrance and disposed in opposed rows with their apices in approximate juxtaposition, and having V-shaped gas passages between said elements, said separator elements having open ends and open bottoms extended in the direction of gas entrance, means to guide the cinder-laden gas stream into the open ends to flow through the open bottoms and upwardly through said V-shaped gas passages between said elements, and a cinder hopper disposed beneath the open bottoms of said elements.

12. A cinder separator having a plurality of V-shaped separator elements arranged with their lengths extended in the direction of gas entrance and disposed in opposed rows with their apices in approximate juxtaposition, and having V-shaped gas passages between said elements, a separating plate arranged between the apices of the rows of separator elements and extended below said elements, said separator elements having open ends and open bottoms disposed in the direction of gas entrance, means to guide the cinder-laden gas stream into the open ends to flow through the open bottoms and upwardly through the V-shaped gas passages between said elements, and a cinder hopper disposed beneath the open bottoms of said elements.

13. Apparatus for separting solid particles from a gas stream, including a duct adapted to be located in the gas stream and having a gas entrance, a dead gas space at the end opposite the gas entrance, said duct being relatively long in the direction of gas entrance and the cross-sectional area of the duct decreasing from its entrance toward said dead gas space, said duct having a gas exit in the decreasing portion of it extended in the direction of gas entrance and the passage through the duct being substantially free, and the duct being constructed and arranged to direct its gas stream toward said dead gas space and to change the direction of its gas stream abruptly between the gas entrance and said space, the entrance to said dead gas space being open.

14. Apparatus for separating solid particles from a gas stream, including a duct adapted to be located in the gas stream and having a gas entrance, a dead gas space at the end opposite the gas entrance, said duct being relatively long in the direction of gas entrance and the cross-sectional area of the duct decreasing progressively from its entrance toward said dead gas space, said duct having a gas exit in the decreasing portion of it extended in the direction of gas entrance and the passage through the duct being substantially free, and the duct being constructed and arranged to direct its gas stream toward said dead gas space and to change the direction of its gas stream abruptly between the gas entrance and said space, the entrance to said space being open, and a flue to receive the gas from the duct, the gas exit from the duct into the flue being arranged to cause the gas stream to change its direction abruptly as it passes from the duct to the flue.

15. Apparatus for separating solid particles from a gas stream, including a plurality of ducts arranged to divide the gas stream into a number of smaller streams, each duct having its length extended in the direction of gas entrance and a dead gas space at the end opposite the gas entrance of the duct, the cross-sectional area of each duct decreasing progressively from its entrance toward said space, each duct having a gas exit in the decreasing portion of it, which exit is extended in the direction of gas entrance, and the passage through the duct being substantially free, and each duct being constructed and arranged to direct its gas stream toward said dead gas space and to change the direction of its gas stream abruptly between the gas entrance and said space, the entrance to said space being open, and a flue arranged to receive and combine into one stream the smaller gas streams from said ducts, the exits from said ducts into said flue being arranged to cause each stream to change its direction abruptly as it passes from its duct into the flue.

16. Apparatus for separating solid particles from a gas stream, including a vertical flue having a dead gas space at the bottom thereof, a horizontal duct located in the gas stream and having a gas entrance and a dead gas space at the end opposite the gas entrance of the duct, said duct having its length extended in the direction of gas entrance, and said duct being constructed and arranged to direct the gas stream toward said space, and having an opening at the bottom extended in the direction of gas entrance and arranged to provide a gas exit between its gas entrance and said space disposed above the dead gas space in said flue.

17. Apparatus for separating the solid particles from a gas stream, including a plurality of horizontal ducts arranged to divide the gas stream into a number of smaller streams, and act upon said smaller streams, each duct having a gas entrance and a dead gas space at the end opposite the gas entrance of the duct, each duct having its length extended in the direction of gas entrance, the passage through said duct being substantially free and the cross-sectional area of the duct decreasing from its gas entrance toward said dead gas space, and each duct being constructed and arranged to direct its gas stream toward said space, and having an opening at the bottom in the decreasing portion of the duct between its gas entrance and said space.

18. Apparatus for separating the solid particles from a gas stream, including a vertical flue having a dead gas space at the bottom thereof, a plurality of horizontal ducts arranged to divide the gas stream into a number of smaller streams, and act upon said smaller streams, each duct having a gas entrance and a dead gas space at the end opposite the gas entrance of the duct, and each duct having its length extended in the direction of gas entrance and being constructed and arranged to direct its gas stream toward said dead gas space, and having an opening at the bottom between its gas entrance and said space disposed above the dead gas space in said flue, said dead gas space being common to all of said ducts and said vertical flue arranged to combine into one stream the smaller gas streams from said ducts.

19. A device for separating solid particles from dust laden gases comprising a dust pocket located outside the gas circulation, a separating element comprising a casing which is relatively long in the direction of gas entrance and which is open at one end to provide a gas inlet to receive dust laden gases and which has the opposite end closed and bent, where it is impinged by solid particles, in the direction of said dust pocket, said casing being provided with a gas outlet between the gas inlet and the closed end, which outlet is extended in the direction of gas entrance, and said closed end is extended below said gas outlet.

20. Apparatus for separating solid particles from a gas stream containing them including a vertical flue having a dust pocket comprising a dead gas space at the lower end thereof, and opposed dust-separating elements disposed in said flue above said dust pocket having their lengths extended in the direction of gas entrance to them and having gas exits disposed in the direction of gas entrance and means to direct gas streams through and between them over said dust pocket.

21. Apparatus for separating solid particles from a gas stream containing them consisting of an element having its length extended in the direction of gas entrance thereto and having a gas outlet extended in the direction of gas entrance, a receptacle disposed beneath said element, said element so constructed and arranged that some of the solid particles are removed from the gas stream within the element and directed beyond the gas stream and deposited into said receptacle and other particles are projected downwardly from the gas stream on leaving the gas outlet of said element and are also deposited in said receptacle.

22. Apparatus for separating solid particles from a gas stream containing them comprising a duct having its length extended in the direction of gas entrance thereto and having a gas inlet and a gas outlet extended in the direction of gas entrance and a solid particle outlet, said duct being constructed and arranged to separate some of the heavier particles from the gas in the duct and project them beyond the gas stream during its passage lengthwise of the duct and direct them to the solid particle outlet, and means including said duct arranged to guide the gas stream through the outlet thereby to project solid particles downwardly out of the gas as the gas leaves the duct.

23. Apparatus for separating solid particles from a gas stream, including a plurality of vertically spaced plates having their lengths extended in the direction of gas entrance to the plates, and means to guide the gas stream in between said plates and down over the lower edges thereof and thence upwardly on the opposite sides of said plates.

24. Apparatus for separating solid particles from a gas stream having a plurality of elements, and passages between said elements, said elements having compartments the lengths of which are extended in the direction of gas entrance thereinto, and openings in the bottom of said compartments extended in the direction of gas entrance, means to direct the gas stream into said compartments and through the openings in the bottoms upwardly through the passages between the elements, and a receptacle for solid particles disposed directly beneath the openings in the bottoms of the compartments in said elements arranged to provide a dead gas space beneath said elements.

25. Apparatus for separating dust from a gas stream, comprising means to provide a dead gas space, and inlet means to initially direct dust laden gas in a wide thin sheet with its width substantially horizontally disposed over said dead gas space and means including a suction device arranged to change the direction of motion of said wide thin gas sheet abruptly over said gas space, whereby to project dust particles from said stream in the said dead gas space.

26. Apparatus for separating dust from a gas stream comprising a flue having a dead gas space, and a duct for the dust laden gases having an exit passage of relatively long extent as compared to height while preserving substantially unobstructed the cross-sectional area of the duct, said exit passage arranged with its long dimension substantially horizontally disposed over and in free communication with the dead gas space, and said duct and flue arranged to cooperate abruptly to change the direction of the gas stream passing through the gas exit and over said dead gas space.

27. Apparatus for separating dust from a gas stream comprising a vertical flue having a dust pocket comprising a dead gas space, two ducts for dust-laden gas having substantially unobstructed opposed gas outlets arranged to discharge gas streams substantially horizontally into said flue over the dead gas space, each gas outlet having a relatively long horizontal extent and a relatively short height, said opposed gas streams adapted to combine and pass up the flue as one stream.

28. Apparatus for separating dust from a gas stream comprising a vertical flue having a dust pocket comprising a dead gas space at the lower end of the flue, a vertically-arranged gas conduit extended externally along said dust pocket having a gas exit at the upper end thereof arranged in substantially free and unobstructed communication with said dust pocket and disposed to discharge the gas stream substantially horizontally into said flue over said dust pocket.

29. Apparatus for separating dust from a gas stream comprising a vertical flue having a dust pocket comprising a dead gas space at the lower end of the flue, a vertically-arranged gas conduit extended externally along said dust pocket having a gas exit at the upper end thereof arranged in substantially free and unobstructed communication with said dead gas space, said gas exit having a long horizontal extent and small vertical height and arranged to discharge the gas in a long thin stream substantially horizontally into said flue over said dust pocket, whereby to project dust particles from said thin stream into the dead gas space of said dust pocket.

30. Apparatus for separating dust from a gas stream comprising a vertical flue having a dust pocket at its lower end, two conduits for dust-laden gases vertically-disposed on opposite sides of the dust pocket having gas exits at the upper ends thereof arranged in substantially free and unobstructed communication with said dust pocket and to discharge opposed gas streams substantially horizontally into said flue over the dust pocket.

31. The combination of a boiler uptake, a dust hopper arranged to enclose a dead gas space disposed in said uptake to divide it in two opposed, substantially vertical passages, said passages having opposed gas outlets at the top disposed in substantially free and unobstructed communication with said dust pocket, said gas outlets arranged to direct opposed gas streams into said uptake substantially horizontally over the dead gas space in said hopper, said passages and uptake arranged to cooperate to change the direction of motion of the opposed gas streams abruptly upward over said dead gas space.

32. The combination of a boiler uptake, a dust hopper arranged to enclose a dead gas space disposed in said uptake to divide it in two opposed, substantially vertical passages, said passages having opposed gas outlets at the top disposed in substantially free and unobstructed communication with said dust pocket, said gas outlets arranged to direct opposed gas streams into said receptacle substantially horizontally over the dead gas space in said hopper, said passages having horizontally long and vertically thin opposed gas outlets at the top arranged to direct vertically thin opposed gas streams substantially horizontally into said uptake over the dead gas space in said hopper, and said passages and uptake arranged to cooperate to change the direction of motion of the opposed gas streams abruptly upward.

In testimony whereof, I have signed my name to this specification.

MAURICE W. CARTY.